(12) United States Patent
Kapphahn

(10) Patent No.: US 9,072,217 B2
(45) Date of Patent: Jul. 7, 2015

(54) VACUUM PLANTER EXHAUST FILTRATION SYSTEM

(71) Applicant: John M. Kapphahn, Elbow Lake, MN (US)

(72) Inventor: John M. Kapphahn, Elbow Lake, MN (US)

(*) Notice: Subject to any disclaimer, the term of this patent is extended or adjusted under 35 U.S.C. 154(b) by 62 days.

(21) Appl. No.: 13/773,882

(22) Filed: Feb. 22, 2013

(65) Prior Publication Data

US 2014/0238284 A1     Aug. 28, 2014

(51) Int. Cl.
*A01C 7/08* (2006.01)
*A01C 15/04* (2006.01)

(52) U.S. Cl.
CPC .......... *A01C 7/081* (2013.01); *A01C 15/04* (2013.01); *A01C 7/084* (2013.01); *A01C 7/082* (2013.01)

(58) Field of Classification Search
CPC .......... A01C 7/081; A01C 7/042; A01C 7/04; A01C 7/00; A01C 7/082; A01C 7/084; A01C 7/08; A01C 15/00; A01C 15/04
USPC .......... 111/170, 174–179, 182–185, 200, 921, 111/922
See application file for complete search history.

(56) References Cited

U.S. PATENT DOCUMENTS

| | | | |
|---|---|---|---|
| 3,920,426 A | 11/1975 | Tu | |
| 4,062,664 A | 12/1977 | Dupre | |
| 4,718,363 A | 1/1988 | Williames | |
| 4,780,279 A | 10/1988 | Enos | |
| 4,793,743 A | 12/1988 | Grodecki | |
| 5,322,098 A | 6/1994 | Christianson | |
| 6,093,250 A * | 7/2000 | Salazar et al. | 118/668 |
| 6,273,153 B1 | 8/2001 | Reinsch | |
| 6,932,236 B2 | 8/2005 | Ven Huizen | |
| 7,373,890 B2 | 5/2008 | Kowalchuk | |
| 8,336,470 B2 | 12/2012 | Rans | |
| 2002/0144637 A1 | 10/2002 | Wendling | |
| 2008/0006190 A1 | 1/2008 | Brueegen | |
| 2008/0121154 A1* | 5/2008 | Memory | 111/174 |
| 2010/0015269 A1* | 1/2010 | Matsushita et al. | 425/143 |

FOREIGN PATENT DOCUMENTS

WO    WO2012029003    8/2011

OTHER PUBLICATIONS

International Search Report received from PCT Office on Jun. 5, 2014.

* cited by examiner

*Primary Examiner* — Christopher J Novosad
(74) *Attorney, Agent, or Firm* — Neustel Law Offices

(57) ABSTRACT

A vacuum planter exhaust filtration system for preventing seed treatment particles used in seed planting from entering the atmosphere. The vacuum planter exhaust filtration system generally includes an air filter fluidly positioned between the fan and the planting units of the vacuum planter. The air filter removes the particulate material prior to being exhausted into the surrounding environment by the fan. The air filter utilizes cyclonic separation to separate the particulate material from the contaminated air from the planting units. A particle container collects the removed particulate material and allows for environmentally friendly disposal of the particulate material.

20 Claims, 3 Drawing Sheets

VACUUM PLANTER EXHAUST FILTRATION SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to vacuum planters and more specifically it relates to a vacuum planter exhaust filtration system for preventing seed treatment particles used in seed planting from entering the atmosphere.

2. Description of the Related Art

Any discussion of the related art throughout the specification should in no way be considered as an admission that such related art is widely known or forms part of common general knowledge in the field.

Vacuum planters are agricultural implements that are used to plant a seed crop in a field. Vacuum planters are desirable over air seeders and conventional planters because they provide for seed singulation resulting in precise placement of individual seeds with even spacing within a field. A vacuum planter operates the opposite of an air seeder because a vacuum pulls seeds to rotating seed plates that have individual vacuum holes that retain the individual seeds until the vacuum is removed from the individual vacuum hole thereby releasing the corresponding seed into a seed tube.

A conventional vacuum planter utilizes a fan to create a vacuum utilized to retain the individual seeds on a planting disc in a meter housing (a.k.a. vacuum housing) in a planting unit until being released into a furrow. Some vacuum planters utilize a central hopper that distributes the seed to the individual planting units via pressurized air and some seeders have individual seed hoppers for each of the planting units. Regardless of the type of vacuum planter utilized, the fan has an exhaust port to release the air drawn into the fan from the planting units that is utilized to retain the seed on the planting disc.

Most seed utilized for vacuum planters is treated with a seed treatment such as but not limited to talc, seed coating, insecticides, herbicides, antimicrobial treatment, fungicides, fertilizer, growth enhancers, seed coloring and other chemicals. Unfortunately, the air drawn in from the planting units by the fan of a vacuum planter includes particulate material comprised of seed treatment removed from the seed during planting. The particulate material drawn into the fan is then exhausted externally of the vacuum planter via the exhaust port of the fan and is free to contaminate the surrounding environment.

European countries have recently linked commonly utilized seed treatment insecticides (e.g. clothianidin, imidacloprid) to harming bees resulting in dramatic drops in bee counts and possibly to colony collapse disorder. It is believed that talc combined with insecticides are blown into the environment by the fan of the vacuum planter where it is mixed with the pollen resulting in exposure to bees feeding on the pollen in the flowers. In addition, the particulate material dispersed into the environment may contaminate standing water near the planting area. Finally, the particulate material being dispersed into the air by the vacuum planter is not desirable to be touched or inhaled by humans.

Because of the inherent problems with the related art, there is a need for a new and improved vacuum planter exhaust filtration system for preventing seed treatment particles used in seed planting from entering the atmosphere.

BRIEF SUMMARY OF THE INVENTION

The invention generally relates to a vacuum planter which includes an air filter fluidly positioned between the fan and the planting units of the vacuum planter. The air filter removes the particulate material prior to being exhausted into the surrounding environment by the fan. The air filter utilizes cyclonic separation to separate the particulate material from the contaminated air from the planting units. A particle container collects the removed particulate material and allows for environmentally friendly disposal of the particulate material.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview.

Figure 1:
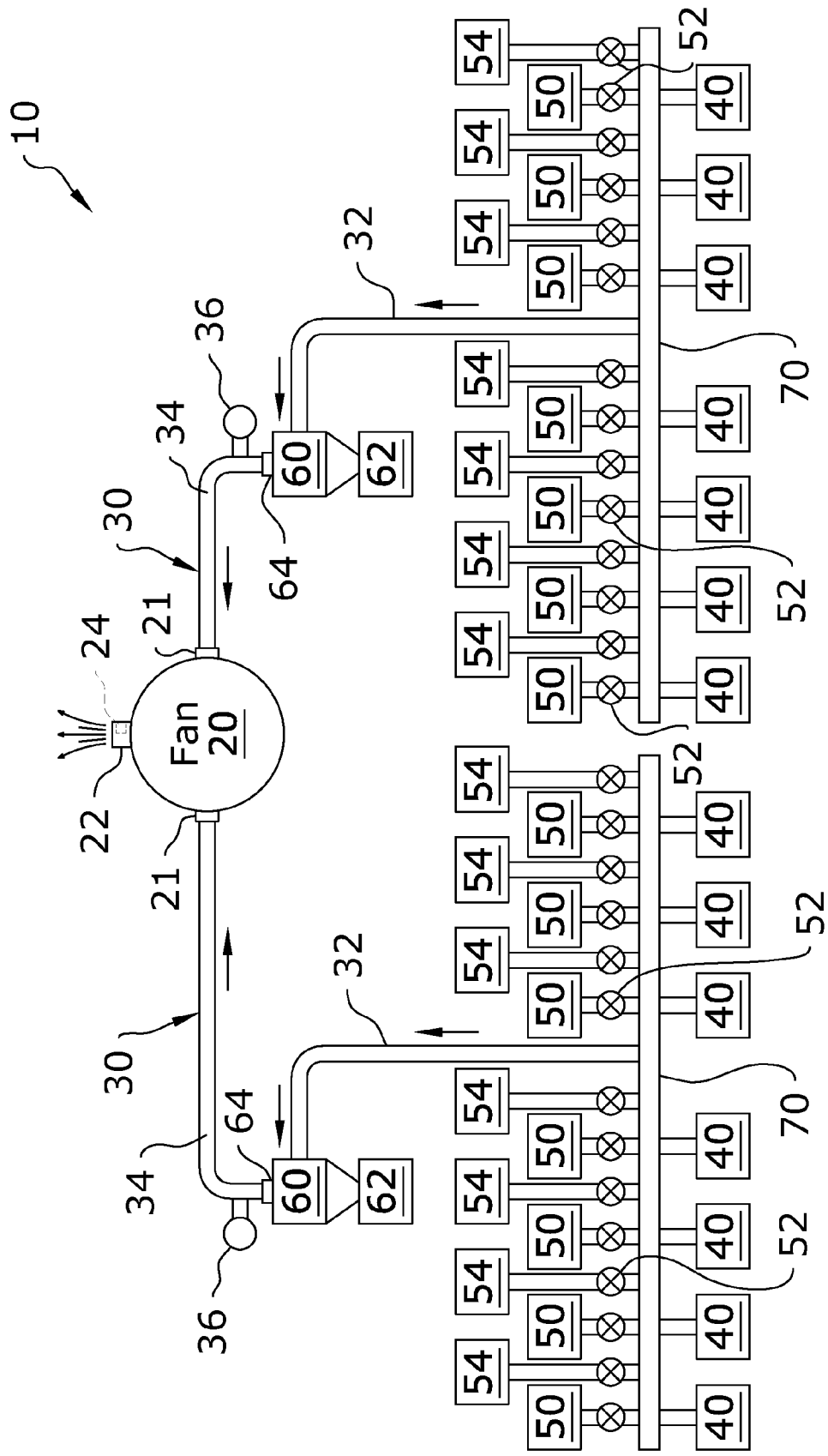
FIG. 1 is a block diagram illustrating the present invention.
Figure 2:
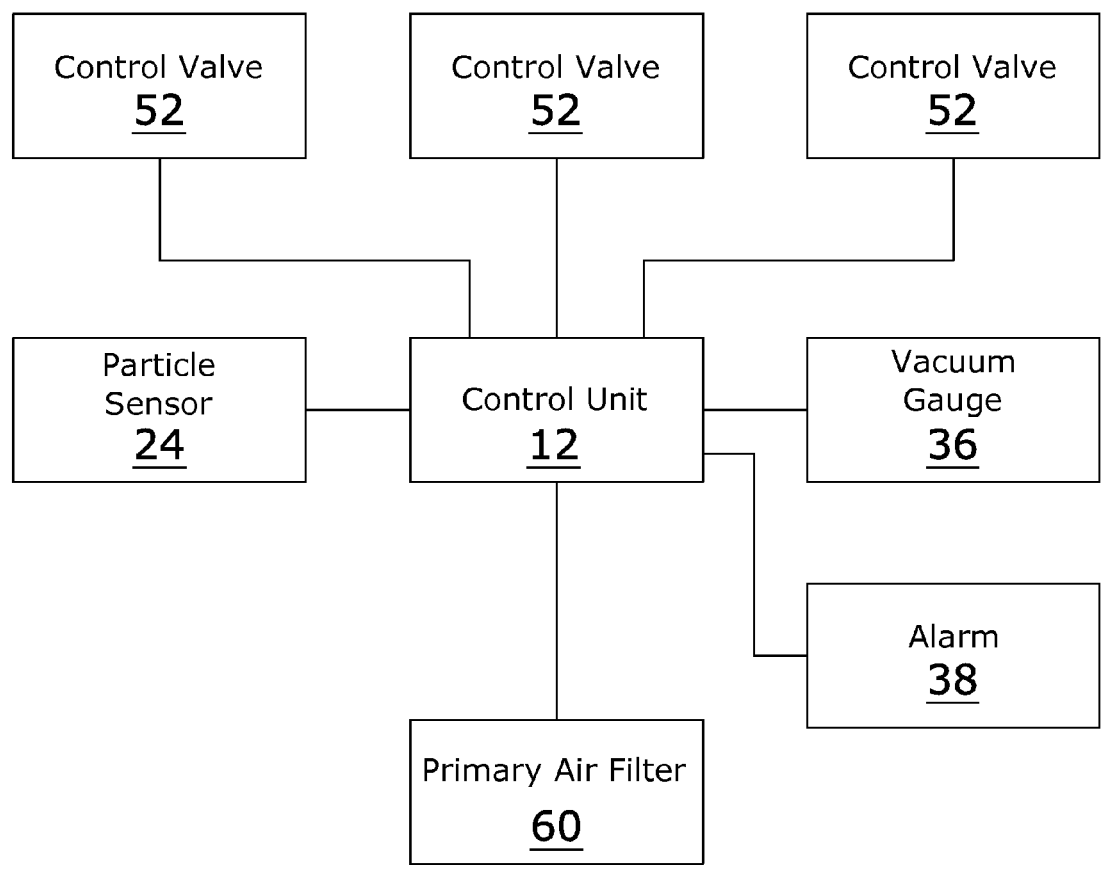
FIG. 2 is a block diagram illustrating the communications between the control unit and components of the present invention.
Figure 3:
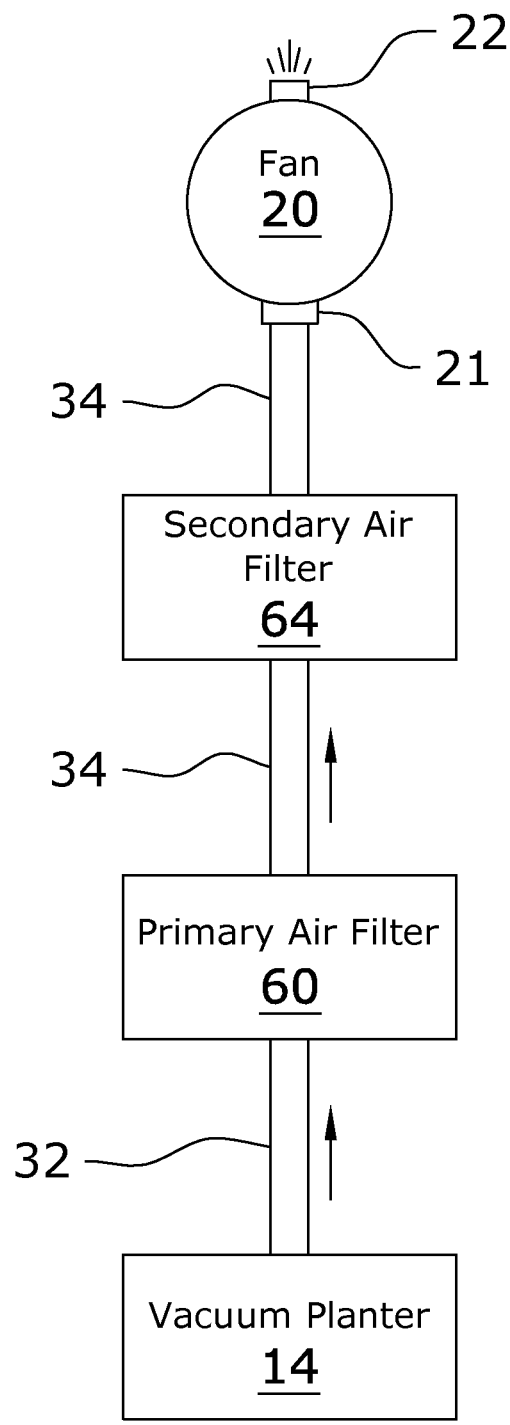
FIG. 3 is a block diagram illustrating the air filter fluidly connected between the fan and the vacuum planter.

Turning now descriptively to the drawings, in which similar reference characters denote similar elements throughout the several views, FIGS. 1 through 3 illustrate a vacuum planter exhaust filtration system 10, which comprises an air filter fluidly positioned between the fan 20 and the planting units 40 of the vacuum planter 14. The air filter removes the particulate material prior to being exhausted into the surrounding environment by the fan 20. The air filter utilizes cyclonic separation to separate the particulate material from the contaminated air from the planting units 40. A particle container 62 collects the removed particulate material and allows for environmentally friendly disposal of the particulate material.

B. Vacuum Planter.

The vacuum planter 14 may be comprised of any planter that utilizes air pressure for planting a crop (e.g. corn, sunflowers, soybeans, etc.) in a plurality of rows. The vacuum planter 14 is typically pulled behind a tractor to plant a field with a desired crop. U.S. Pat. No. 6,626,120 to Bogner et al. discloses an exemplary vacuum planter 14 suitable for use within the present invention and is hereby incorporated by reference herein.

The vacuum planter 14 includes a plurality of planting units 40 that meter the seed received from a central hopper into furrows. The seed within the central hopper is drawn by a vacuum to each of the planting units 40 via separate seed tubes which is commonly known in the industry. Alternatively, each planting unit 40 may have an individual seed hopper 50 and also potentially a corresponding individual chemical hopper 54 to apply fertilizer. Each of the planting units 40 meters the individual seeds into each corresponding furrow created by utilizing a meter disc within a meter housing (a.k.a. vacuum housing). The meter disc (a.k.a. a seed plate) includes a plurality of vacuum holes that provide a vacuum that retains one seed upon each hole, wherein the meter disc rotates until the vacuum is removed from the hole thereby releasing the seed into a seed tube which is well known with respect to vacuum planters 14.

The vacuum planter 14 includes a fan 20 having an intake port 21 and an exhaust port 22. A particle sensor 24 is positioned within the exhaust port 22 of the vacuum planter 14 to determine the level of particulate material remaining in the exhausted air and is in communication with the control unit 12 regarding the same to notify the operator of the tractor. The fan 20 is typically a centrifugal fan 20 but may be comprised of other types of fans commonly utilized for vacuum planters 14. A conventional vacuum planter 14 utilizes the fan 20 to create a vacuum that is utilized to draw seeds to the individual planting units 40 and also retain the individual seeds on a planting disc (a.k.a. seed disc, meter disc) in a meter housing (a.k.a. vacuum housing) in a planting unit 40 until being released into a furrow. Regardless of the type of vacuum planter 14 utilized, the fan 20 has an exhaust port 22 to release the air drawn into the fan 20 from the planting units 40 that is utilized to retain the seed on the planting disc.

As illustrated in FIG. 1 of the drawings, the vacuum planter 14 further preferably includes a primary manifold 70 that is fluidly connected to the intake port 21 of the fan 20 via a vacuum conduit 30 (e.g. pipe, flexible hose, etc.). The primary manifold 70 extends along the width of the vacuum planter 14 to provide vacuum pressure to each of the individual planting units 40. Each of the individual planning units is fluidly connected to the primary manifold 70 via a conduit (e.g. pipe, flexible hose, etc.) as illustrated in FIG. 1 of the drawings. For larger vacuum planters 14, two or more primary manifolds 70 may be utilized for corresponding segments of the vacuum planter 14 as illustrated in FIG. 1 of the drawings.

C. Primary Air Filter.

The primary air filter 60 is fluidly connected to the fan 20 to filter the particulate material (e.g. solid particles, dust, chemical particles, insecticide particles) from a return airflow from the vacuum planter 14 to the fan 20 prior to being exhausted externally of the fan 20. In particular, the primary air filter 60 removes various types of particulate material drawn into the primary manifold 70 by the vacuum pressure such as but not limited to talc, seed coating, insecticides, herbicides, antimicrobial treatment, fungicides, fertilizer, growth enhancers, seed coloring and other chemicals utilized in planting of seed crops.

As illustrated in FIGS. 1 and 3 of the drawings, the primary air filter 60 is fluidly positioned between the fan 20 and the planting units 40 of the vacuum planter 14. In particular, the primary air filter 60 is fluidly positioned between the primary manifold 70 and the intake port 21 of the fan 20. The primary air filter 60 is fluidly positioned within the vacuum conduit 30 that fluidly connects the primary manifold 70 and the fan 20 as further illustrated in FIG. 1 of the drawings. As further shown in FIG. 1, if two or more primary manifolds 70 are utilized, a corresponding number of primary air filters 60 are preferably utilized between the same and the fan 20. Alternatively, one primary air filter 60 may receive the vacuum air flow from two or more primary manifolds 70 for cleaning. The first segment 32 of the vacuum conduit 30 enters an upper portion of the primary air filter 60 and a second segment 34 of the vacuum conduit 30 exits the upper end of the primary air filter 60 continuing to the fan 20 which draws the air through the primary air filter 60.

The primary air filter 60 preferably includes a particle container 62 that receives separated particulate material. The particle container 62 may be attached to the lower end of the primary air filter 60 to receive the particulate material that falls downwardly through a lower opening in the primary air filter 60. The particle container 62 may be periodically removed for environmentally friend disposal of the collected particulate material.

The primary air filter 60 preferably does not utilize a media (e.g. fibrous materials) to trap the particulate material. In particular, the primary air filter 60 is preferably comprised of a cyclonic separator that separates the particulate material from the return airflow. U.S. Pat. No. 7,247,180 to Hill discloses an exemplary cyclonic separator suitable for use within the present invention and is hereby incorporated by reference herein.

D. Secondary Filter.

A secondary filter 64 may be fluidly connected between the primary air filter 60 and the fan 20 to remove any remaining particulate material within the airflow that the primary air filter 60 did not remove as illustrated in FIGS. 1 and 3 of the drawings. The secondary filter 64 is preferably comprised of a media (e.g. fibrous material, pleated paper filter, foam, cotton). The secondary filter 64 may be cleaned and/or replaced periodically as needed.

E. Vacuum Conduit.

The vacuum conduit 30 includes a first segment 32 fluidly connected between the vacuum planter 14 and the primary air filter 60, and a second segment 34 fluidly connected between the primary air filter 60 and the fan 20 as illustrated in FIGS. 1 and 3 of the drawings. The vacuum conduit 30 may be comprised of any tubular structure capable of transferring airflow under a vacuum pressure without collapsing (e.g. pipe, flexible hose).

F. Control Unit.

FIG. 2 illustrate the control unit 12 which may be comprised of any electronic device capable of receiving, storing and calculating data (e.g. computer). The control unit 12 is preferably positioned within the cab of the tractor and includes a conventional display to display information relating to vacuum pressure, operation of the fan 20, state of the control valves 52, activation of the alarm 38, display readings from the particle sensor 24 and the like.

The control unit 12 is in communication with and receives data from the particle sensor 24 to determine the level of particulate material within the exhaust airflow discharged from the exhaust port 22 of the fan 20. If the level of particulate material exceeds a predetermined level, an alarm 38 (e.g. audible, visual, combination of audible and visual) is activated within the tractor to notify the operator that the functionality of the present invention may be hampered (e.g. the primary filter is not operating properly). In addition, the control unit 12 is in communication with the vacuum gauge 36 which is fluidly connected to the vacuum conduit 30 to measure the vacuum pressure within the vacuum conduit 30. If the vacuum pressure is greater than a predetermined maximum threshold or below a predetermined minimum threshold, the alarm 38 is activated to notify the operator of a potentially undesirable state for the present invention.

G. Control Valves.

The plurality of seed hoppers 50 and the plurality of chemical hoppers 54 are fluidly connected to the primary manifold 70 by a conduit (e.g. pipe, flexible hose) as illustrated in FIG. 1 of the drawings. The control valves 52 may be comprised of any valve capable of stopping the passage of airflow in a pressurized environment (e.g. solenoid valves, etc.).

At least one control valve 52 is fluidly positioned between the hoppers 50, 54 and the primary manifold 70 to open or close a vacuum flow to the hoppers 50, 54. If a central seed hopper 50 is utilized, the same fluid connection to the central seed hopper 50 is utilized except that the vacuum pressure is preferably receive by fluid connection directly to the vacuum conduit 30. FIG. 1 illustrates a plurality of control valves 52 fluidly connected between each of the hoppers 50, 54 and the primary manifold 70. The primary manifold 70 is preferably fluidly connected to upper portions of the hoppers 50, 54 to draw in air contaminated with particulate material entering the air during the filling process.

The control valves 52 may be opened or closed by the control unit 12 which is in communication with the control valves 52. The control valves 52 are typically closed when utilizing the vacuum planter 14 for seeding. However, when the operator is filling the hoppers 50, 54 the control valves 52 are preferably opened by the control unit 12 to draw the particulate material that enters the air within the interior of the hoppers 50, 54 during the filling process thereby reducing the amount of particulate material that escapes into the surrounding environment during filling.

H. Operation of Preferred Embodiment.

In use, the vacuum planter 14 is filled with seed in the central seed hopper 50 or the individual seed hoppers 50 for each of the planting units 40. During the filling of the seed hopper 50 within seed, the control valve 52 fluidly connected to the seed hopper 50 is opened with the fan 20 operating to create a vacuum that draws the particulate material in the air within the seed hopper 50 to the primary air filter 60 for removal before entering the surrounding atmosphere. When filling the chemical hopper 54, the control valve 52 fluidly connected to the chemical hopper 54 is opened with the fan 20 operating to create a vacuum that draws the particulate material in the air within the chemical hopper 54 to the primary air filter 60 for removal before entering the surrounding atmosphere. After the seed hoppers 50 and the chemical hoppers 54 are filled and closed, the controls valves are closed to ensure adequate vacuum pressure within the individual planting units 40. The vacuum pressure is a negative pressure created by the intake port 21 of the fan 20 that draws in air.

The vacuum planter 14 is utilized as a conventional vacuum planter 14 to plant seeds within the field. During the planting, particulate material (e.g. talc, insecticide) is removed from the seed as the seed is acquired, retained and released from the seed disc within the planting unit 40. In particular, the vacuum holes in the seed disc receive the removed particulate material from the seed which is then drawn into the primary manifold 70. The particulate material is then drawn by the vacuum pressure through the first segment 32 of the vacuum conduit 30 into the primary air filter 60 to remove a majority of the particulate material from the airflow. It is preferable that the primary air filter 60 remove at least 95% of the particulate material within the airflow. The airflow then passes through a secondary filter 64 to remove a majority of the particulate material not removed by the primary air filter 60. The cleaned air is then drawn into the intake port 21 of the fan 20 and then exhausted through the exhaust port 22 of the fan 20. The particulate sensor determines the level of particulate material and communicates the level to the control unit 12 for display to the operator. The control unit 12 may also be in communication with a level sensor within the particle container 62 of the primary air filter 60 to activate the alarm 38 or provide a notification to the user that the level of particulate material accumulated within the particle container 62 has exceeded a specified level and the particle container 62 needs to be emptied. The particle container 62 may be removed with the particulate material inside environmentally disposed of without contaminating the surrounding environment.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A vacuum planter filtration system, comprising:
a vacuum planter for planting a crop, wherein said vacuum planter includes a fan having an intake port and an exhaust port, and a plurality of planting units fluidly connected to said intake port via a vacuum conduit; and
a primary air filter fluidly connected to said fan to filter particulate material from a return airflow prior to being exhausted externally of said fan, wherein said return airflow flows from said vacuum planter to said fan, wherein said primary air filter is fluidly positioned between said fan and said planting units of said vacuum planter.

2. The vacuum planter filtration system of claim 1, wherein said vacuum conduit includes a first segment fluidly connected between said vacuum planter and said primary air filter, and a second segment fluidly connected between said primary air filter and said fan.

3. The vacuum planter filtration system of claim 2, wherein said second segment is fluidly connected between said primary air filter and said intake port of said fan.

4. The vacuum planter filtration system of claim 1, wherein said primary air filter does not utilize a media to trap said particulate material.

5. The vacuum planter filtration system of claim 1, wherein said primary air filter separates said particulate material from said return airflow.

6. The vacuum planter filtration system of claim 1, wherein said primary air filter is comprised of a cyclonic separator.

7. The vacuum planter filtration system of claim 1, wherein said primary air filter includes a particle container that receives separated particulate material.

8. The vacuum planter filtration system of claim 1, wherein said particulate material includes insecticides.

9. The vacuum planter filtration system of claim 1, including a particle sensor that determines a level of particulate material within an exhaust airflow discharged from said exhaust port.

10. The vacuum planter filtration system of claim 1, including a secondary filter fluidly connected between said primary air filter and said fan.

11. The vacuum planter filtration system of claim 1, wherein said primary air filter is fluidly connected between said intake port of said fan and said planting units of said vacuum planter.

12. A vacuum planter filtration system, comprising:
a vacuum planter for planting a crop, wherein said vacuum planter includes a fan having an intake port and an exhaust port, and a plurality of planting units fluidly connected to said intake port via a vacuum conduit;
a primary air filter fluidly connected to said intake port of said fan to filter insecticides from a return airflow prior to being exhausted externally of said fan, wherein said return airflow flows from said vacuum planter to said fan; and
a particle sensor that determines a level of said insecticides within an exhaust airflow discharged from said exhaust port.

13. The vacuum planter filtration system of claim 12, wherein said primary air filter is fluidly positioned between said fan and said planting units of said vacuum planter.

14. The vacuum planter filtration system of claim 13, wherein said vacuum conduit includes a first segment fluidly connected between said vacuum planter and said primary air filter, and a second segment fluidly connected between said primary air filter and said fan.

15. The vacuum planter filtration system of claim 12, wherein said primary air filter does not utilize a media to trap said insecticides.

16. The vacuum planter filtration system of claim 12, wherein said primary air filter includes a particle container that receives said insecticides filtered by said fan.

17. The vacuum planter filtration system of claim 12, wherein said primary air filter is fluidly connected between said intake port of said fan and said planting units of said vacuum planter.

18. The vacuum planter filtration system of claim 12, wherein said second segment is fluidly connected between said primary air filter and said intake port of said fan.

19. A vacuum planter filtration system, comprising:
a vacuum planter for planting a crop, wherein said vacuum planter includes a fan having an intake port and an exhaust port, and a plurality of planting units fluidly connected to said intake port via a vacuum conduit;
a primary air filter fluidly connected to said intake port of said fan to filter insecticides from a return airflow prior to being exhausted externally of said fan, wherein said primary air filter is fluidly positioned between said intake port of said fan and said planting units of said vacuum planter, wherein said return airflow flows from said vacuum planter to said fan, wherein said primary air filter includes a particle container that receives said insecticides filtered by said fan;
wherein said vacuum conduit includes a first segment fluidly connected between said vacuum planter and said primary air filter, and a second segment fluidly connected between said primary air filter and said fan, wherein said second segment is fluidly connected between said primary air filter and said intake port of said fan; and
a particle sensor that determines a level of said insecticides within an exhaust airflow discharged from said exhaust port.

20. The vacuum planter filtration system of claim 19, including a secondary filter fluidly connected between said primary air filter and said intake of said fan.

* * * * *